United States Patent [19]

Steck et al.

[11] Patent Number: 5,009,877
[45] Date of Patent: Apr. 23, 1991

[54] STABILIZATION OF ACICULAR FERROMAGNETIC CHROMIUM DIOXIDE

[75] Inventors: Werner Steck; Laszlo Marosi, both of Ludwigshafen; Herbert Haberkorn, Gruenstadt; Rainer Feser, Hessheim; Werner Huebner; Helmut Jakusch, both of Frankenthal, all of Fed. Rep. of Germany

[73] Assignee: BASF Aktiengesellschaft, Fed. Rep. of Germany

[21] Appl. No.: 481,777

[22] Filed: Feb. 20, 1990

Related U.S. Application Data

[63] Continuation of Ser. No. 917,611, Oct. 10, 1986, abandoned.

[30] Foreign Application Priority Data

Oct. 10, 1985 [DE] Fed. Rep. of Germany ....... 3536116
Jan. 11, 1986 [DE] Fed. Rep. of Germany ...... 3600624

[51] Int. Cl.$^5$ ............................................. C01G 37/02
[52] U.S. Cl. .................................... 423/607; 423/266; 106/286.8; 252/62.51; 427/127; 427/128; 65/2; 65/5; 65/6; 264/21.1
[58] Field of Search ............................... 423/266, 607; 106/286.8; 252/62.51 C; 427/127, 128; 65/2, 5, 6; 264/21.1

[56] References Cited

U.S. PATENT DOCUMENTS

| | | | |
|---|---|---|---|
| 3,512,930 | 5/1970 | Bottjer et al. | 252/62.51 |
| 3,686,031 | 8/1972 | Balthis | 252/62.51 |
| 3,687,726 | 8/1972 | Pye | 252/62.54 |
| 3,904,538 | 9/1975 | Katada et al. | 252/62.51 |
| 3,929,978 | 12/1975 | Morero et al. | 252/62.51 |
| 3,979,310 | 9/1976 | Montiglio et al. | 423/607 |
| 4,169,802 | 10/1979 | Basile et al. | 252/62.51 |
| 4,374,118 | 2/1983 | Basile et al. | 423/607 |
| 4,495,246 | 1/1985 | Steck et al. | 427/127 |
| 4,670,177 | 6/1987 | Ohlinger et al. | 252/62.51 C |
| 4,769,293 | 9/1988 | Hosoo et al. | 252/62.54 |
| 4,781,851 | 11/1988 | Steck et al. | 252/62.56 |

FOREIGN PATENT DOCUMENTS 63-271712 11/1988 Japan .

Primary Examiner—Theodore Morris
Assistant Examiner—Ed. Squillante
Attorney, Agent, or Firm—Keil & Weinkauf

[57] ABSTRACT

Acicular ferromagnetic chromium dioxide is stabilized by treatment with an alkali metal hydroxide in an aqueous alkaline suspension at elevated temperatures.

3 Claims, No Drawings

STABILIZATION OF ACICULAR FERROMAGNETIC CHROMIUM DIOXIDE

This application is a continuation of application Ser. No. 917,611, filed on Oct. 10, 1986 now abandoned.

The present invention relates to a process for stabilizing acicular ferromagnetic chromium dioxide.

The preparation of acicular ferromagnetic chromium dioxide and the use of this material for magnetic recording media have been described in many publications. Magnetic recording media which contain chromium dioxide generally possess magnetic properties which are superior to those of recording media based on other magnetic oxides.

However, it is also known that the magnetic properties of recording media containing nonstabilized chromium dioxide deteriorate in the course of time. Ferromagnetic chromium dioxide in powder form is substantially stable in the absence of moisture, and no change in the magnetic properties is observed over a long period. It has however been found that chromium dioxide can be attacked both by water and by other materials, for example the organic polymer binders used in the preparation of magnetic recording media, with decomposition to nonmagnetic components. In the case of magnetic recording media, this means not only a loss in terms of the magnetic properties and hence the electroacoustic characteristics but also a deterioration in the mechanical properties. This deterioration is accelerated at elevated temperatures. There has therefore been no lack of attempts to overcome these disadvantages. For example, U.S. application No. 3,512,930 describes the treatment of chromium dioxide powder with a reducing agent, while DE-A 2 325 132 states that the action of gaseous reducing agents increases the Curie point. In other processes, alumina coatings (U.S. application No. 3,687,726) or coatings of sparingly soluble metal phosphates (U.S. application No. 3,686,031) are produced. The application of metal compounds whose cations are capable of forming sparingly soluble chromates has also been disclosed. JA-A-21200/76 proposes applying magnetic iron oxides to the surface in order to coat the chromium dioxide particles, while DE-A- 27 49 757 describes the application of iron(III)-containing oxidic precipitates to the chromium dioxide.

The common feature of all these processes for stabilizing chromium dioxide both against deterioration of the magnetic properties and against deterioration of the binder matrix surrounding it is that they are intended to produce a multiphase or bulky protective shell using special chemicals. This means that either they are difficult to define and to reproduce or, because of their volume, they reduce the proportion of magnetic substance excessively.

It is an object of the present invention to provide a process for stabilizing acicular ferromagnetic chromium dioxide which gives, in a simple and controllable manner, a magnetic material which can be used to prepare magnetic recording media which have the absolutely essential high quality of the electroacoustic characteristics and furthermore result in good tape stability under conditions of high temperature and humidity.

We have found that this object is achieved in a surprisingly simple manner if, in order to improve the stability of acicular ferromagnetic chromium dioxide, the latter is heated in an aqueous suspension in the presence of an alkali metal hydroxide at a pH greater than 9 and at from 35° C. to the boiling point of the suspension for not less than 20 minutes.

In an advantageous embodiment of the novel process, the alkali metal hydroxide is added to the aqueous suspension of chromium dioxide in an amount such that the pH is brought from greater than 9 and up to 12.5 for the entire duration of treatment, and the heat treatment is carried out for from 20 minutes to not more than 10 hours.

In a particular embodiment of the novel process, the alkali metal hydroxide is added to the aqueous suspension of the chromium dioxide in an amount such that the initial pH is not less than 10, and the duration of the heat treatment is chosen to be from 20 minutes to not more than 18 hours.

The chromium dioxide employed for the novel process is prepared by a conventional method, as described in, for example, EP-B-27 640. It may be advantageous to subject this chromium dioxide material to a mechanical treatment beforehand, for example dry milling or wet milling, or to compact it mechanically or disperse it beforehand. Another equally advantageous chromium dioxide material is one which already possesses orthorhombic CrOOH on part or all of its surface, for example as a result of a reaction with water either during the conventional preparation process or in a separate after-treatment.

To carry out the process according to the invention, the chromium dioxide is suspended in water by, for example, vigorous stirring. It is advantageous to maintain a ratio of 1 part of powder to not less than 4 parts of water. The alkali metal hydroxide, usually sodium hydroxide and/or potassium hydroxide, generally in the form of an aqueous solution, is then added to this suspension. The amount is chosen sd that the pH of the suspension is not less than 9, a pH of from 9 to 12.5 being particularly advantageous. Thereafter, the alkaline chromium dioxide suspension is brought to not less than 35° C., in particular to the boiling point of the suspension. The suspension is kept at this temperature for not less than 20 minutes but no longer than 18 hours, advantageously from 1 to 6 hours. In carrying out the novel treatment of the chromium dioxide, it has proven particularly advantageous to keep the pH of the suspension constant during the entire period of treatment. The suspension is then filtered, the residue is washed with water and the filter cake is dried in a conventional manner, for example using a belt dryer or spray dryer. This treatment of the chromium dioxide may also be carried out in a circulation apparatus, in which wet milling is effected at the same time, if appropriate in conjunction with particle size classification.

The novel process gives a chromium dioxide material whose particle structure, consisting of a $CrO_2$ core and a nonmagnetic CrOOH-containing shell, achieves the set object of simultaneously improving important performance characteristics while at the same time providing very good tape stability under conditions of high temperature and humidity. This core/shell particle model can be demonstrated, for example, by means of the known technique of secondary ion mass spectroscopy (SIMS) by recording depth profiles. This method of measurement is described in, inter alia, Ullmann's Encyklopadie der technischen Chemie, 4th edition, volume 5, pages 519–576.

The advantageous properties of the chromium dioxides prepared according to the invention become apparent when they are used as magnetic material for the preparation of magnetic recording media. Processing can be carried out by a conventional method. For the preparation of the magnetic layer, from 20 to 50 parts by weight of chromium dioxide, 1 part of the binder or binder mixture and suitable dispersants, lubricants and other conventional additives in a total amount of not more than 10% by weight, based on the chromium dioxide, are processed to give a dispersion. The dispersion thus obtained is filtered and applied by means of a conventional coating apparatus, for example a knife coater, in one or more thin layers on a nonmagnetic base or in a thin layer on a magnetic recording medium already provided with another magnetic layer. Before the liquid coating mixture is dried at from 50° to 90° C., the chromium dioxide particles are oriented magnetically if desired. For special surface treatment of the magnetic layer, the coated film webs are passed between heated, polished rollers under pressure. Thereafter, the magnetic layers are usually from 1.5 to 12 μm thick.

Suitable binders for the magnetic layers are the known polymer binders, such as vinyl chloride copolymers, acrylate copolymers, polyvinylacetals, such as polyvinylformal or polyvinylbutyral, fairly high molecular weight epoxy resins, polyurethanes and mixtures of these and similar binders. Substances which have proven advantageous are the elastomeric and virtually isocyanate-free linear polyester urethanes which are soluble in a volatile organic solvent, these polyesterurethanes being obtainable by reacting a polyester obtained from an aliphatic dicarboxylic acid of 4 to 6 carbon atoms, such as adipic acid, and one or more aliphatic diols of 3 to 10 carbon atoms, such as 1,2- or 1,3-propylene glycol, butane-1,4-diol, diethylene glycol, neopentyl glycol or octane-1,8-diol, with a diisocyanate of 6 to 24, in particular 8 to 20, carbon atoms, such as toluylene diisocyanate or 4,4'-diisocyanatodiphenylmethane, preferably in the presence of a small amount of a glycol of 4 to 10 carbon atoms, such as butane-1,4-diol, which acts as a chain extender. Preferred polyester urethanes are those obtained from adipic acid, butane-1,4-diol and 4,4'-diisocyanatodiphenylmethane and having a Shore A hardness of from 70 to 100, a strength of from 400 to 420 kp/cm$^2$ and an elongation of about 440–560%. Polymer binders based on a copolymer of from 70 to 95, in particular from 75 to 90, % by weight of vinyl chloride and from 5 to 30, in particular from 10 to 25, % by weight of an alkyl ester of an olefinically unsaturated carboxylic acid of 3 to 5 carbon atoms, such as acrylic acid, methacrylic acid or maleic acid, where the alkyl radical is preferably of 1 to 3 carbon atoms, have also proven useful. Noteworthy among these are the corresponding vinyl chloride copolymers with one or more $C_1$–$C_3$-dialkyl maleates, such as copolymers of from 70 to 90% by weight of vinyl chloride, from 5 to 15% by weight of dimethyl maleate and from 5 to 15% by weight of diethyl maleate. The K value according to H. Fikentscher is from 40 to 60 (1% strength in dimethylformamide) for the particularly suitable polymer binders.

Compared with recording media containing the known chromium dioxide, the magnetic recording media produced using the chromium dioxides prepared according to the invention possess improved sensitivity and maximum output level at short wavelengths coupled with very good stability under conditions of high temperature and humidity.

The Examples which follow illustrate the process according to the invention, and comparative experiments relate it to the prior art. The magnetic properties of the powder samples were measured using a vibrating sample magnetometer in a magnetic field of 160 kA/m, or in a vibrating sample of magnetometer after biasing in a discharge capacitor. The values of the coercive force $H_c$, measured in [kA/m], were based on a tap density $\rho$ of 1.3 g/cm$^3$ for the powder measurements. The specific remanence ($M_r/\rho$) and saturation magnetization ($M_m/\rho$) are each stated in [nTm$^3$/g]. The specific surface area $SN_2$ of the pigments was determined by the BET method in m$^2$/g, i.e. nitrogen was adsorbed on weighed, evacuated, gas-free pigment samples. The difference in the amounts of nitrogen before and after adsorption is converted to the area occupied and expressed as a ratio of the sample weight.

The stability of the magnetic recording media under conditions of high temperature and humidity was measured at 65° C. and 95% relative humidity. To do this, a magnetic recording medium was stored under these conditions in a conditioning cabinet for 7 days, after which the residual magnetization was measured at room temperature. The ratio of the $M_r$ value measured after exposure to humidity and heat ($M_r(t)$) to the initial value ($M_r(o)$) is given, or, where storage is for 14 days, the $M_r(14)$ value. The magnetic properties were determined using a vibrating sample magnetometer in a magnetic field of 160 kA/m. The coercive force $H_c$ in [kA/m], the residual magnetization $M_r$ and the saturation magnetization $M_s$ in [mT] were measured, and the orientation ratio Rf was calculated as the quotient of the residual induction along the preferred magnetic direction to that in the crosswise direction. The electroacoustic properties of the magnetic recording media were determined according to DIN 45,512, sheet II, with reference to the IEC II standard tape.

The chromium dioxide samples were also investigated in terms of their processibility for the preparation of magnetic recording media. For this purpose, a gloss development test was carried out to determine the difficulty of dispersing (DH-2) of the pigment and the achievable final dispersion state ($G_{300}$). To do this, the chromium dioxide was dispersed in a standard mixture, and the gloss of coatings as a function of time was determined using a reflectometer from Lange, Berlin. The difficulty of dispersing was calculated from the time-dependence of the gloss, as follows:

$$DH\text{-}2 = \left( \frac{G_{300}}{G_{75}} - 1 \right) \cdot 100$$

EXAMPLE 1

A chromium dioxide prepared as described in Example 1 of EP-B 27 640 was dried at 120° C. in the air, without the iron(II) sulfate aftertreatment (sample 1). 100 parts of the material were then suspended in 1500 parts of water at 22° C., and sodium hydroxide solution was added to the vigorously stirred suspension until the pH reached 12. Thereafter, the mixture was heated to the boil, and the stirred mixture was kept at this temperature for the time stated in Table 1. (Samples 2, 3 and 4). The still hot suspension was finally filtered, and the filter cake was washed thoroughly with water and dried at 50° C. under reduced pressure from a water pump.

The magnetic properties of the resulting materials are stated in Table 1. Furthermore, the CrO$_3$ content, based on $CrO_2$, of the samples was determined photometrically by the diphenylcarbazide method, 1 g of each sample in 100 ml of water being heated for 5 minutes and the filtrate being used for analysis.

COMPARATIVE EXPERIMENT 1

The chromium dioxide employed in Example 1 and dried at 120° C. in air was suspended, in a ratio of 1:10, in water containing 10% by weight, based on the chromium dioxide, of sodium sulfite. The suspension was stirred at room temperature for 30 minutes, after which the chromium dioxide was filtered off, washed with water and dried at 50° C. under reduced pressure (sample 5). The results are stated in Table 1.

EXAMPLE 2

As described in Example 1, a chromium dioxide prepared according to Example 1 of EP-B 27 640 but doped with 1.3% by weight of gamma-iron(III) oxide, and without the aftertreatment described there, was dried at 120° C. in a nitrogen atmosphere (sample 6). 100 parts of this sample 6 were suspended in 1500 parts of water, after which the pH was brought to 12.2 with 15% strength technical-grade sodium hydroxide solution. Thereafter, the mixture was heated to the boil in the course of 60 minutes and then kept at this temperature for 7 hours. Samples were taken hourly (samples 7 to 12) and investigated as described in Example 1. Part of sample 12 was cooled overnight in a suspension, filtered off, washed and spray-dried at 125° C. (sample 13). The results are stated in Table 1.

COMPARATIVE EXPERIMENT 2

Sample 6, obtained as described in Example 2, was treated at 25° C. in an aqueous suspension, as described in Example 31 of DE-C 19 25 541, with 13% by weight, based on the amount of chromium dioxide, of sodium sulfite, and was filtered off, washed and spray-dried (sample 14). The results are stated in Table 1.

EXAMPLE 3

The procedure described in Example 2 was followed, except that the ratio of chromium dioxide to water in the suspension was 1:8. The residence time of samples 15 to 18 in the alkaline suspension is stated in the table, sample 18 being spray-dried only after it had cooled to room temperature. The results are stated in Table 1.

TABLE 1

| Sample No. | Duration of treatment (h) | $H_c$ | $M_r/p$ | $M_m/p$ mg | $CrO_3/$ g $CrO_2$ |
|---|---|---|---|---|---|
| Example No. | | | | | |
| 1  1 | — | 38 | 48 | 88 | 18.8 |
| 1  2 | 6 | 43 | 40 | 75 | 5.4 |
| 1  3 | 12 | 44 | 36 | 70 | 7.7 |

TABLE 1-continued

| Sample No. | Duration of treatment (h) | $H_c$ | $M_r/p$ | $M_m/p$ mg | $CrO_3/$ g $CrO_2$ |
|---|---|---|---|---|---|
| 1 | 4 | 18 | 44 | 36 | 68 | 8.2 |
| Comparative Experiment | | | | | |
| 1  5 | — | 41 | 41 | 76 | 8.8 |
| 2  6 | — | 47 | 50 | 90 | 16.9 |
| 2  7 | 1 | 52 | 44 | 78 | 4.4 |
| 2  8 | 2 | 52 | 44 | 78 | 3.4 |
| 2  9 | 3 | 50 | 43 | 77 | 3.4 |
| 2  10 | 4 | 51 | 42 | 75 | 3.5 |
| 2  11 | 5 | 52 | 42 | 74 | 3.6 |
| 2  12 | 6 | 51 | 40 | 74 | 3.5 |
| 2  13 | 6 with cooling | 51 | 41 | 73 | 4.8 |
| 2  14 | — | 49 | 44 | 77 | 8.3 |
| 3  15 | 0.5 | 48 | 45 | 82 | 6.3 |
| 3  16 | 1.0 | 49 | 44 | 80 | 7.2 |
| 3  17 | 2.0 | 50 | 44 | 79 | 6.4 |
| 3  18 | 2.0 with cooling | 49 | 43 | 77 | 7.5 |

EXAMPLE 4

In a mill having a capacity of 250 parts by volume and containing 100 parts by volume of steel balls of 1.5 mm diameter, 40 parts of the chromium dioxide sample stated in Table 2, 175 parts of a 13% strength solution of a thermoplastic polyester urethane obtained from adipic acid, butane-1,4-diol and 4,4'-diisocyanatodiphenylmethane in a mixture of equal amounts of tetrahydrofuran and dioxane, 150 parts of a 13% strength solution of a commercial polyvinylformal in a mixture of equal amounts of tetrahydrofuran and dioxane, 24 parts of a solvent mixture consisting of equal amounts of tetrahydrofuran and dioxane, and 1 part of zinc oleate were mixed and the mixture was dispersed for 4 hours. Thereafter, the same amounts of the two binder solutions, 13.5 parts of the stated solvent mixture and 0.1 part of a commercial silicone oil were added, and dispersing was continued for a further 30 minutes. The dispersion was then filtered and applied on a conventional coating apparatus by means of a knife coater onto a 10 μm thick polyethylene terephthalate film in a thickness such that, after drying and calendering, a dry layer 5.5 μm thick was obtained. Directly after the liquid dispersion had been cast, the acicular chromium dioxide particles were oriented along the recording direction by means of a magnetic field. The magnetic and electroacoustic properties measured for the tape samples, and the tape stability under conditions of high temperature and humidity, are shown in Table 2.

TABLE 2

| | | $CrO_2$ sample No. | | | | | | | | |
|---|---|---|---|---|---|---|---|---|---|---|
| | | 1 | 5 | 2 | 14 | 7 | 8 | 9 | 10 | 12 | 13 |
| $H_c$ | | 39 | 40 | 43 | 49 | 49 | 50 | 51 | 52 | 50 | 51 |
| $M_r$ | | 182 | 170 | 161 | 172 | 166 | 153 | 153 | 153 | 167 | 152 |
| $R_f$ | | 2.3 | 2.9 | 3.5 | 2.9 | 2.5 | 2.5 | 2.6 | 2.5 | 3.1 | 2.9 |
| Stability $M_r(t)/M_r(o)$ | [%] | 80.0 | 89.0 | 90.5 | 88.2 | 88.9 | 89.5 | 90.2 | 89.9 | 89.8 | 88.7 |
| Sensitivity at short wavelengths | $E_H$ | −0.7 | +0.6 | +1.3 | +2.0 | +3.5 | +2.5 | +3.5 | +2.5 | +3.5 | +4.0 |
| Maximum output level at short wavelengths | $A_H$ | 0 | +1.4 | +2.0 | +3.0 | +3.5 | +4.0 | +5.0 | +3.5 | +5.5 | +6.0 |

EXAMPLE 5

A $CrO_2$ prepared according to Example 1 of EP-B 27 640 using 0.3% by weight of $Fe_2O_3$ and 0.14% of $Sb_2O_3$ as dopants and having a BET value of 26 $m^2/g$ was dried at 120° C. in a stream of nitrogen for 80 minutes, without the aftertreatment with iron(II) sulfate stated there (sample 1 with BET $SN_2$ value of 25.3 $m^2/g$). Thereafter, 100 parts of sample 1 were suspended in 1000 parts of water at 20° C. and the suspension was heated to the treatment temperature stated in Table 3 while stirring with a paddle stirrer. After the desired treatment temperature had been reached, the $CrO_2$ suspension was brought to the pH stated in Table 3 by means of aqueous sodium hydroxide solution and this pH was maintained, by means of an automatic control, for the duration likewise stated in Table 3. After certain times, the intermediate samples designated Z, corresponding to 100 ml of suspension, were taken, and these samples were filtered and washed with water in the same way as the major part of the reaction batch (H). The resulting washed filter cake was dried at 50° C. under reduced pressure from a water pump. The properties measured for the $CrO_2$ pigments 1 to H27 thus obtained are shown in Table 3.

COMPARATIVE EXPERIMENT 3

The chromium dioxide (sample 1) used in Example 5 and dried at 120° C. under nitrogen was suspended in water in a ratio of 1:10, the water containing 13% by weight, based on the chromium dioxide, of sodium sulfite. The suspension was stirred for 30 minutes at room temperature, after which the chromium dioxide was filtered off, washed with water and dried at 50° C. under reduced pressure (sample V3). The results are shown in Table 3.

TABLE 3

|  | Sample No. | Duration of treatment [h] | T (°C.) | pH | $H_c$ | $M_m$ | $M_r$ | DH-2 | $G_{300'}$ | BET $m^2/g$ |
|---|---|---|---|---|---|---|---|---|---|---|
| Example 5 | 1 | — | — | — | 40 | 89 | 49 |  |  | 25.3 |
|  | Z2 | 2 | 35 | 9.0 | 39 | 88 | 47 |  |  |  |
|  | Z3 | 4 | 35 | 9.0 | 39 | 89 | 46 |  |  |  |
|  | H4 | 6 | 35 | 9.0 | 39 | 89 | 46 | 17.8 | 92.4 | 25.6 |
|  | Z5 | 2 | 35 | 10.5 | 40 | 90 | 49 |  |  |  |
|  | Z6 | 4 | 35 | 10.5 | 40 | 89 | 47 |  |  |  |
|  | H7 | 6 | 35 | 10.5 | 39 | 88 | 46 | 8.8 | 94.1 | 25.5 |
|  | Z8 | 2 | 35 | 12.5 | 41 | 87 | 46 |  |  |  |
|  | Z9 | 4 | 35 | 12.0 | 41 | 85 | 45 |  |  |  |
|  | H10 | 6 | 35 | 12.0 | 40 | 87 | 46 | 5.2 | 94.8 | 25.4 |
|  | Z11 | 2 | 55 | 9.0 | 40 | 83 | 44 |  |  |  |
|  | Z12 | 4 | 55 | 9.0 | 39 | 82 | 42 |  |  |  |
|  | H13 | 6 | 55 | 9.0 | 39 | 83 | 42 | 1.9 | 96.4 | 23.3 |
|  | Z14 | 2 | 55 | 10.5 | 40 | 84 | 45 |  |  |  |
|  | Z15 | 4 | 55 | 10.5 | 40 | 83 | 43 |  |  |  |
|  | H16 | 6 | 55 | 10.5 | 40 | 80 | 42 | 2.7 | 97.1 | 26.0 |
|  | Z17 | 2 | 55 | 12.0 | 40 | 86 | 45 |  |  |  |
|  | Z18 | 4 | 55 | 12.0 | 40 | 84 | 43 |  |  |  |
|  | H19 | 6 | 55 | 12.0 | 40 | 80 | 41 | 1.3 | 96.5 | 25.2 |
|  | Z20 | 2 | 75 | 9.0 | 40 | 80 | 42 |  |  |  |
|  | Z21 | 4 | 75 | 9.0 | 40 | 76 | 40 |  |  |  |
|  | H22 | 6 | 75 | 9.0 | 40 | 74 | 39 | 3.1 | 97.2 | 26.8 |
|  | Z23 | 2 | 75 | 10.5 | 41 | 78 | 41 |  |  |  |
|  | Z24 | 4 | 75 | 10.5 | 42 | 76 | 40 |  |  |  |
|  | H25 | 6 | 75 | 10.5 | 41 | 75 | 39 | 8.7 | 96.7 | 27.1 |
|  | Z26 | 2 | 75 | 12.0 | 42 | 78 | 42 |  |  |  |
|  | H27 | 4 | 75 | 12.0 | 42 | 75 | 41 | 11.9 | 95.1 | 26.9 |
| Comparative example 3 | V3 | — | — | — | 41 | 78 | 42 | 23.7 | 91.8 | 25.8 |

EXAMPLE 6

In a mill having a capacity of 250 parts by volume and containing 100 parts by volume of steel balls of 1.5 mm diameter, 40 parts of the chromium dioxide samples stated in Table 4, 175 parts of a 13% strength solution of a thermoplastic polyester urethane obtained from adipic acid, butane-1,4-diol and 4,4'-diisocyanatodiphenylmethane in a mixture of equal amounts of tetrahydrofuran and dioxane, 150 parts of a 13% strength solution of a commercial polyvinylformal in a mixture of equal amounts of tetrahydrofuran and dioxane, 24 parts of a solvent mixture consisting of equal amounts of tetrahydrofuran and dioxane, and 1 part of zinc oleate were mixed and the mixture was dispersed for 4 hours. Thereafter, the same amounts of the two binder solutions, 13.5 parts of the stated solvent mixture and 0.1 part of a commercial silicone oil were added, and dispersing was continued for a further 30 minutes. The dispersion was then filtered and applied on a conventional coating apparatus by means of a knife coater onto a 10 μm thick polyethylene terephthalate film in a thickness such that, after drying and calendering, a dry layer 5.5 μm thick was obtained. Directly after the liquid dispersion had been cast, the acicular chromium dioxide particles were oriented along the recording direction by means of a magnetic field. The magnetic properties measured for the tape samples, and the tape stability under conditions of high temperature and humidity, are shown in Table 4.

TABLE 4

|  |  | $CrO_2$ sample No. | | | | | | | | | |
|---|---|---|---|---|---|---|---|---|---|---|---|
|  |  | H4 | H7 | H10 | H13 | H16 | H19 | H22 | H25 | H27 | V3 |
| $H_c$ | [kA/m] | 39 | 40 | 39 | 39 | 39 | 39 | 39 | 40 | 41 | 40 |
| $H_r$ | [mT] | 201 | 192 | 190 | 181 | 180 | 187 | 177 | 167 | 163 | 161 |
| $H_r/H_m$ |  | 0.91 | 0.92 | 0.91 | 0.92 | 0.91 | 0.91 | 0.91 | 0.90 | 0.90 | 0.89 |

TABLE 4-continued

| | | CrO$_2$ sample No. | | | | | | | | | |
|---|---|---|---|---|---|---|---|---|---|---|---|
| | | H4 | H7 | H10 | H13 | H16 | H19 | H22 | H25 | H27 | V3 |
| R$_f$ | | 3.8 | 3.9 | 3.8 | 4.1 | 3.6 | 3.9 | 3.8 | 3.3 | 3.7 | 2.9 |
| H$_r$(14) | BmT] | 153 | 150 | 158 | 157 | 158 | 163 | 158 | 152 | 143 | 140 |

We claim:

1. A process for stabilizing acicular ferromagnetic chromium dioxide which consists essentially of heating the chromium dioxide in an aqueous suspension which contains sufficient alkali metal hydroxide to adjust the pH of the suspension to greater than 9 and at from 35° C. to the boiling point of the suspension for not less than 20 minutes to form chromium dioxide particles consisting of a CrO$_2$ core and at least a partial nonmagnetic Cr OOH— containing shell wherein the chromium dioxide possesses orthorhombic Cr OOH at least on part of its surface.

2. The process of claim 1, wherein the initial pH of the suspension is brought to a constant value of from greater than 9 and up to 12.5 for the entire duration of the treatment, and the heat treatment is carried out at from 35° to 75° C. for from 20 minutes to 10 hours.

3. The process of claim 1, wherein the initial pH of the suspension is not less than 10 and the heat treatment is carried out at from 80° C. to the boiling point of the suspension for from 20 minutes to 18 hours.

* * * * *